Dec. 28, 1943.  H. P. SMITH  2,337,780
AGRICULTURAL IMPLEMENT
Filed Oct. 30, 1940

Inventor
Hiram P. Smith
By Paul O. Pippel
Atty.

Patented Dec. 28, 1943

2,337,780

UNITED STATES PATENT OFFICE 2,337,780

AGRICULTURAL IMPLEMENT

Hiram P. Smith, Canton, Ill., assignor to International Harvester Company, a corporation of New Jersey Application October 30, 1940, Serial No. 363,526

5 Claims. (Cl. 97—47)

This invention relates to agricultural implements, and more particularly to lifting mechanism for moving implements to and from their working position.

Heretofore, tillage tools have been connected to a tractor for lateral movement as well as for vertical movement to and from ground-working position. Such tools necessarily had to be laterally adjustable for changing over their connection to a tractor so that they may be operable for the cultivation of more widely or less narrowly spaced crop rows. With this mechanism is included rockable means. Upon the inclusion of a rockable means, it was found when laterally adjusting these implements to a greater row spacing that it become necessary to provide a rock-shaft which was of longer length in order to have the lifting arms thereon located in vertical alinement with the working tools. This necessitated the provision with an implement arrangement of a second rock-shaft which would replace the original much shorter rock-shaft theretofore used when the implements were located on the tractor in their narrower adjustment.

It is, therefore, the object of the present invention to provide a rockable means adapted for connection to the tractor wherein a lifting arm is connected to the rockable means in such a manner that it may be laterally adjusted for proper alinement with the working tool when it has been laterally adjusted to a new position on the tractor.

According to the present invention there has been provided in the rockable means a main hollow sleeve-like element which is journaled permanently on the tractor. Fitted within this element are the shaft portions of a lifting arm means. These shaft portions of the lifting arm means are of sufficient length so that they may be slidable in and out of the hollow element depending upon the lateral adjustment of the working tool. In either their fully extended or unextended position, within the hollow element, said shaft portions may be fixed thereto so as to be rockable therewith.

Figure 1:
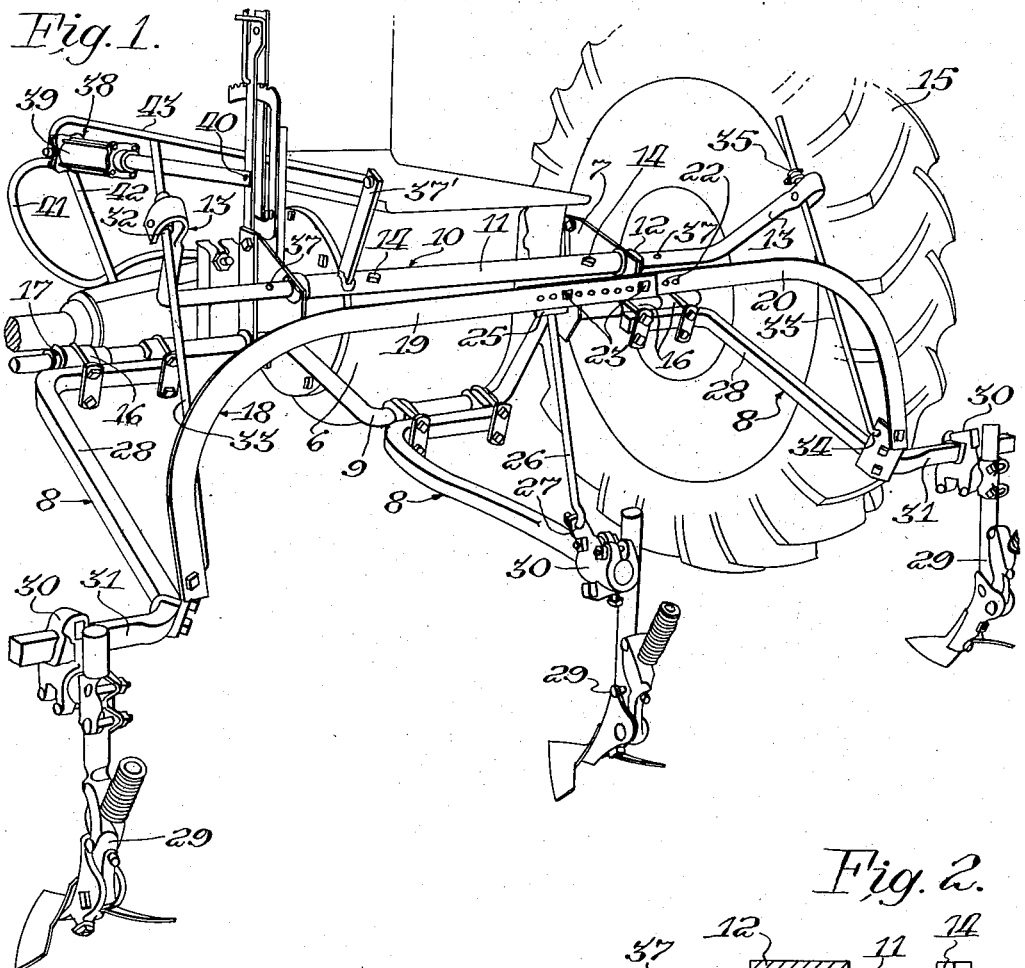
Figure 2:
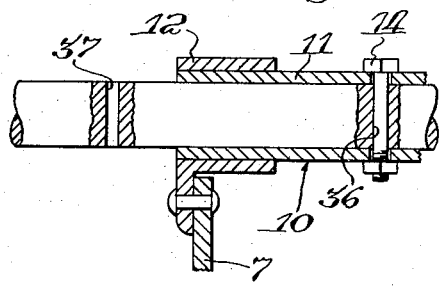

For a better understanding of the invention, reference may be had to the following detailed description taken in connection with the accompanying drawing, in which:

Figure 1 is a perspective view looking at the rear of a tractor on which is connected for lateral adjustment a plurality of working tools and illustrating more particularly the arrangement of the rockable means on the tractor; and, Figure 2 is a detail sectional view or fragmentary view partly in cross section illustrating the connection of the lifting arm means within the hollowed axle portion journaled on the tractor.

Referring now particularly to Figure 1 there is shown a portion of a tractor or tool supporting means having a rear axle structure 6 to which is connected by means of vertically extending brackets 7, a plurality of vertically adjustable working tools 8 which are in turn connected to these vertically extending frame structures 7 by means of a transversely extending, centrally bowed, shaft means 9 which extends substantially the full width of the tractor. Immediately above the working tools on these vertically extending frame structures 7 is journaled a rockable structure 10 including a hollow element or sleeve 11 journaled at its ends to the respective frame structure 7 as shown more in detail in Figure 2. Each of the frame structures 7 supports a bearing element 12 through which extends the sleeve 11. The rockable means also includes a pair of lifting arm means 13 having a shaft portion adapted to extend well within the hollow sleeve 11 of the rockable means 10, wherein it may be fixed in either its extended or unextended position by means of a bolt 14 extending through the diameter of the sleeve 11 in a manner shown more clearly in Figure 2.

Concurrent with the adjusting of the working tools laterally of the tractor it is necessary that the drive wheels 15 of the tractor and located at each side of the tractor are likewise laterally adjusted. This provision of means to laterally adjust the tractor drive wheels is common in practically all of the farm tractors now on the market. When the tractor drive wheels have been laterally adjusted, the outer working tools 8, which are connected to the transverse axle structure 9, by a journal bearing means 16, may be respectively laterally adjusted to a position more laterally removed from the center of the tractor as shown in Figure 1. They may be held in their laterally adjusted position by set collar means 17 surrounding the axle structure 9. As further means for maintaining the working tools in their laterally extended position, there is provided an arch bracing member 18 extending between the two outside working tools. This arch bracing member may also be laterally extended inasmuch as it is constructed of separable members 19 and 20 having a series of holes 21 and 22 respectively. The two members 19 and 20 may be held in their adjusted position by bolt means 23. The working tool located centrally of the tractor may be connected to the central portion of the arched means 18 as indicated at 25 and through this arch means the lifting of the centrally located working tool is effected, the means 25 including a lifting rod 26 connected to the centrally located working tool as indicated at 27. Each of the working tools 8 may include a tool beam 28 having a cultivator shovel 29 rigidly connected thereto by means of a standard clamp 30. Each of the outer tools includes a laterally extending portion 31 to which the cultivator shovel is connected. These working shovels 29 when in their finally adjusted position are usually located to follow the tractor wheels and serve as a means for extinguishing the track left by the tractor drive wheel.

Each of the lifting arm means 13 includes a trunnion 32 pivoted at their respectivce free ends of the lifting arm portion of the lifting means and through which may slide the lift rods 33 connected at their lower ends respectively to the tool beams 28 of the working tools 8 as indicated at 34. On the upper end of these lift rods 33 is fixed respectively a set collar 35 adapted to be engaged by the trunnion 32 as the rockable structure 10 is rocked in a forward direction. A continued rocking movement of the rockable structure will effect lifting of the working tools 8.

It should be noted upon referring to Figure 1 particularly that the lifting means 13 are arranged in their extended position and that the bolt means 14 extending through the diameter of the sleeve 11 passes through a transverse opening 36 as viewed more clearly in Figure 2. When the working tools are moved to their narrow cultivating arrangement, the lifting arm means 13 may be moved also toward the center of the tractor so that the shaft portion thereof extends more fully within the sleeve 11 of the rockable structure 10 whereby an opening 37, as shown in Figure 2, will be in registry with the bolt means 14 by which it can be held in operative relationship with the rockable structure 10 in the unextended position.

The sleeve 11 has rigidly connected thereto an arm 37' whereby force is applied to the rockable structure to effect rocking movement of the same. Any power actuated means such as a fluid cylinder 38 adapted to react against the tractor, as indicated at 40, is used for rocking the rockable structure 10. As the fluid actuated cylinder 39 is extended by fluid delivered to it through a hose connection 41 by means of a fluid pump, not shown, but which may be of a type such as shown in the patent to Lindgren, 2,213,401, September 3, 1940. The fluid actuated cylinder 39 is supported for movement on the tractor by a freely swingable arm 42 and the connection is made between the cylinder part of the device 39 to the arm 37' by means of a link 43.

It should now be apparent that there has been provided a rockable structure which has a laterally adjustable lifting arm whereby the same rockable structure is utilized for the lifting of working tools whether they be arranged in their laterally extended position on the tractor or whether they be arranged in their unextended position on the tractor.

While various changes may be made in the detail construction of the present invention, it shall be understood that such changes will be within the spirit and scope of the present invention as defined by the appended claims.

What is claimed is:

1. In combination, tool-supporting means including a bearing and working tool attaching means spaced vertically therefrom, laterally spaced working tools connected to the tool-attaching means for both lateral and vertical adjustment, brace means adjustable in length connecting said working tools, means for vertically adjusting the working tools including a rockable structure having a hollow member journaled in said bearing, a lifting arm connected to the working tools and having a shaft portion directed at an angle therefrom, said shaft portion being disposed coaxially of and within said bearing and said hollow member where it is slidably adjustable axially within the latter to facilitate lateral adjustment of the working tools with respect to the tool-supporting means, means for preventing relative rotation between said hollow member and the shaft portion of the lifting arm in each adjusted position to transmit the force for rotating said lifting arm from the rockable structure, and means for adjusting the length of said brace means to correspond with the adjustment of said working tools.

2. In combination, a vehicular implement having laterally spaced attaching parts, a plurality of working tools connected to said attaching parts for lateral and vertical adjustment, brace means adjustable in length connecting said working tools, lifting means for and respectively connected with said tools for lateral adjustment therewith, coaxial bearings spaced upon the implement in parallelism with the spacing of said attaching parts, an elongated open-ended hollow member extending between and journaled in said bearings, a force-applying arm attached to said hollow member for rotating the same in said bearings, lifting arms having respective shank portions directed at an angle therefrom and projecting toward one another through the open ends of said hollow member and through said bearings telescopically into opposite end portions of said hollow member, said arms being connectable with said lifting means for cooperation therewith in lifting said tools upon rotation of said lifting arm shank portions in said bearings, means for connecting said shank portions non-rotatively with said hollow member at selected telescopic adjustments thereon to impart the aforesaid rotation to said shanks from the hollow member and to facilitate the connection of said lifting means between the tools and said lifting arms when the tools are laterally adjusted, and means for adjusting the length of said brace means to correspond with the adjustment of said working tools.

3. In combination, tool-supporting means, spaced working tools connected to said tool-supporting means for vertical movement with respect thereto, means for adjusting the spacing of said working tools, means for vertically moving said working tools including a rockable structure adjustable in length, means for adjusting the length of said rockable structure, and means for adjusting the length of said brace means to correspond with the adjustment of said working tools and said rockable structure.

4. In combination, tool-supporting means, spaced working tools projecting from said tool-supporting means and connected thereto for vertical pivotal movement, means for adjusting the relative spacing of said working tools, brace means adjustable in length connecting the projecting ends of said working tools, means for vertically moving said working tools including a rockable structure adjustable in length, means for adjusting the length of said rockable structure, and means for adjusting the length of said brace means to correspond with the adjustment of said working tools and said rockable structure.

5. In combination, tool-supporting means, spaced working tools projecting from said tool-supporting means and connected thereto for vertical pivotal movement, means for adjusting the relative spacing of said working tools, brace means adjustable in length connecting the projecting ends of said working tools, means for vertically moving said working tools including a rockable structure generally parallel with said brace means and said tool-supporting means, means connecting said rockable structure with said working tools for vertical movement thereof, means for adjusting the length of said rockable structure to correspond with the adjustment of said working tools, and means for adjusting the length of said brace means to correspond with the adjustment of said working tools and said rockable structure.

HIRAM P. SMITH.